US012731414B2

(12) United States Patent
Sjoedin Haellstrand

(10) Patent No.: US 12,731,414 B2
(45) Date of Patent: Sep. 8, 2026

(54) AI TECHNIQUES FOR BLINKING LIGHT DETECTION FOR VEHICLE APPLICATIONS

(71) Applicant: Qualcomm Auto LTD., Cambridge (GB)

(72) Inventor: Andreas Sjoedin Haellstrand, Linköping (SE)

(73) Assignee: Qualcomm Auto Ltd., Cambridge (GB)

( * ) Notice: Subject to any disclaimer, the term of this patent is extended or adjusted under 35 U.S.C. 154(b) by 304 days.

(21) Appl. No.: 18/156,953

(22) Filed: Jan. 19, 2023

(65) Prior Publication Data

US 2024/0249533 A1 Jul. 25, 2024

(51) Int. Cl.

*G06V 20/58* (2022.01)
*G06V 10/70* (2022.01)
*G06V 10/77* (2022.01)
*G06V 10/82* (2022.01)

(52) U.S. Cl.

CPC ............ *G06V 20/584* (2022.01); *G06V 10/77* (2022.01); *G06V 10/87* (2022.01); *G06V 10/82* (2022.01)

(58) Field of Classification Search

CPC ...... G06V 20/584; G06V 10/77; G06V 10/87; G06V 10/82; G06V 10/25; G06V 10/764
See application file for complete search history.

(56) References Cited

U.S. PATENT DOCUMENTS 10,461,858 B2 * 10/2019 Raynor .................. H04W 4/46
10,958,293 B1 * 3/2021 Bustin ................ H03M 7/3059
12,147,495 B2 * 11/2024 Swaminathan ....... G06F 16/583
2010/0303349 A1 * 12/2010 Bechtel .................. G06T 11/10 382/165
2018/0068191 A1 * 3/2018 Biemer ..................... G06T 7/70
2019/0354786 A1 * 11/2019 Lee ........................ G06N 3/084
2020/0274997 A1 * 8/2020 Elvira ................ G06F 18/2431
2022/0058453 A1 * 2/2022 Malach .................. G06N 3/084
2023/0056390 A1 * 2/2023 Balasubramanian ... H04W 4/40
2023/0162508 A1 * 5/2023 Xia ........................ G06V 20/56 382/104
2023/0186486 A1 * 6/2023 Zhang ................. G06V 10/469 382/103
2024/0203244 A1 * 6/2024 Debnath .............. G08G 1/0112
2024/0249533 A1 * 7/2024 Sjoedin Haellstrand .................... G06V 10/764

OTHER PUBLICATIONS

International Search Report and Written Opinion—PCT/EP2023/085456—ISA/EPO—Apr. 26, 2024.

* cited by examiner

*Primary Examiner* — Md K Talukder
(74) *Attorney, Agent, or Firm* — Norton Rose Fulbright US LLP

(57) ABSTRACT

This disclosure provides systems, methods, and devices for vehicle driving assistance systems that support image processing. In a first aspect, a method of image processing includes receiving a first image frame and determining a portion of the image frame that contains a candidate blinking light source. A model may be used to determine a first encoding based on the portion of the first image frame. A second model may use a a sequence of encodings to determine a lighting determination for the first candidate blinking light source. The sequence of encodings may include the first encoding. Other aspects and features are also claimed and described.

30 Claims, 6 Drawing Sheets

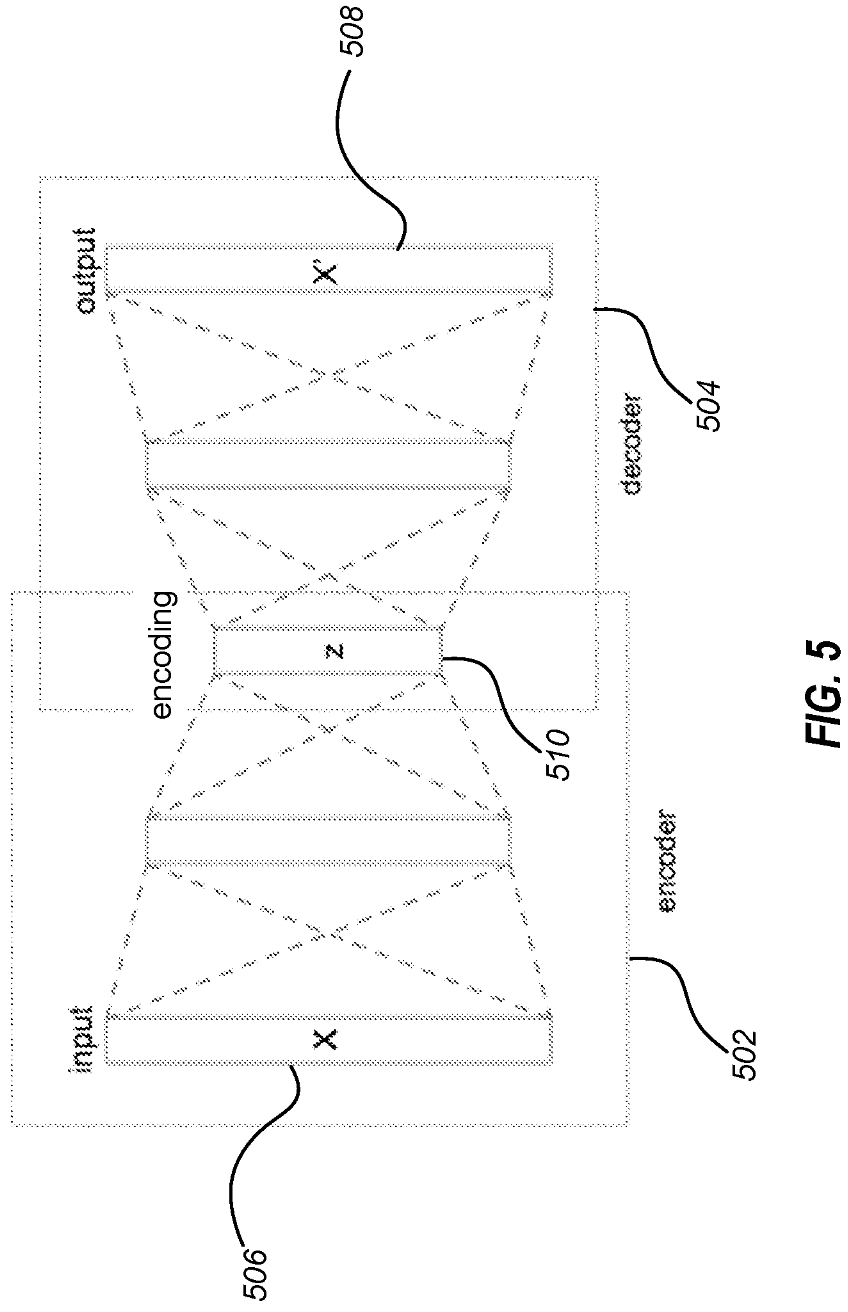
FIG. 5

AI TECHNIQUES FOR BLINKING LIGHT DETECTION FOR VEHICLE APPLICATIONS

TECHNICAL FIELD

Aspects of the present disclosure relate generally to driver-operated or driver-assisted vehicles, and more particularly, to methods and systems suitable for supplying driving assistance or for autonomous driving.

Introduction

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

One aspect includes a method for image processing for use in a vehicle assistance system. The method also includes receiving a first image frame. The method also includes determining a subset of the first image frame that contains a first candidate blinking light source. The method also includes determining, with a first model, a first encoding based on the subset of the first image frame. The method also includes determining, with a second model and based on a sequence of encodings, a lighting determination for the first candidate blinking light source, where the sequence of encodings includes the first encoding.

An additional aspect includes an apparatus. The apparatus also includes a memory storing processor-readable code. The apparatus also includes at least one processor coupled to the memory, the at least one processor configured to execute the processor-readable code to cause the at least one processor to perform operations including: receiving a first image frame; determining a subset of the first image frame that contains a first candidate blinking light source; determining, with a first model, a first encoding based on the subset of the first image frame; and determining, with a second model and based on a sequence of encodings, a lighting determination for the first candidate blinking light source, where the sequence of encodings includes the first encoding.

A further aspect includes a non-transitory computer-readable medium storing instructions that. The non-transitory computer-readable medium storing instructions also includes receiving a first image frame. The instructions also includes determining a subset of the first image frame that contains a first candidate blinking light source. The instructions also includes determining, with a first model, a first encoding based on the subset of the first image frame. The instructions also includes determining, with a second model and based on a sequence of encodings, a lighting determination for the first candidate blinking light source, where the sequence of encodings includes the first encoding.

A still further aspect includes a vehicle with an imaging system configured to capture images from the vehicle. The vehicle also includes a detection system configured to receive a first image frame from the imaging system; determine a subset of the first image frame that contains a first candidate blinking light source; determine, with a first model, a first encoding based on the subset of the first image frame; and determine, with a second model and based on a sequence of encodings, a lighting determination for the first candidate blinking light source, where the sequence of encodings includes the first encoding.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 depicts a training process for an encoder model according to an exemplary embodiment of the present disclosure.

Like reference numbers and designations in the various drawings indicate like elements.

DETAILED DESCRIPTION

Figure 1:
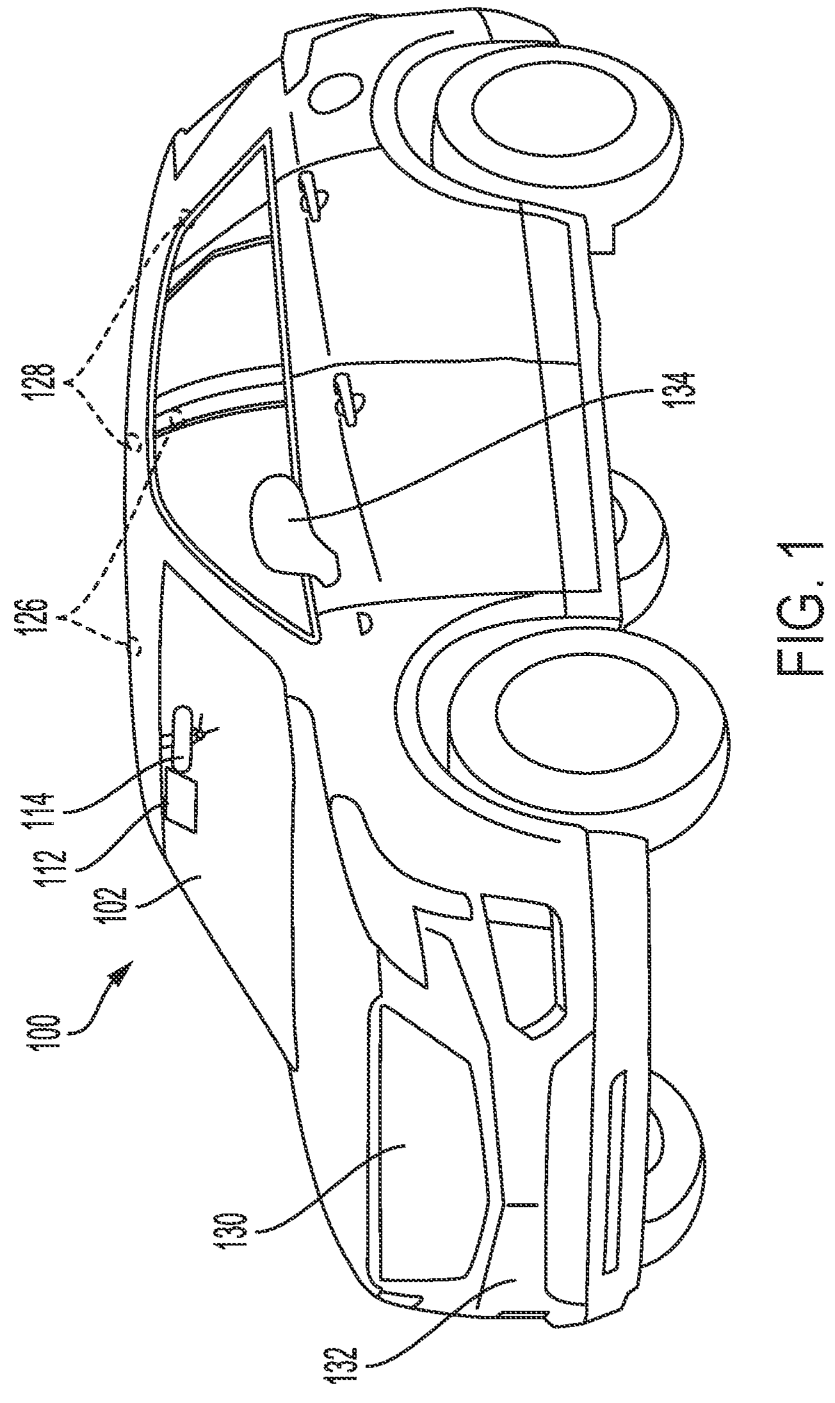
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support automated detection of when a light source in view of the vehicle is blinking. In particular, the discussed techniques enable the use of artificial intelligence (AI) and machine learning techniques to process sequences of images to detect whether one or more light sources within the images are blinking (such as according to one or more lighting protocols).

Neural networks may typically process individual image frames, or small numbers of image frames, at the same time due to the large amount of pixel data and associated bandwidth requirements for image files. However individual image frames, or small collections of image frames may typically be insufficient to detect whether a light source (such as a vehicle turn signal) depicted in the image frames is blinking (as the light source in any given image frame is typically either on or off). For example, if an imaging system operates at 15 frames per second and the blinking frequency of a light source is once per second, it may be necessary to incorporate at least 15 image frames to decide whether the light source is blinking. Furthermore, the number of image frames necessary may differ depending on the light source (such as depending on a blinking frequency of the light source). Providing enough image data to cover possible blinking frequencies may be prohibitively computationally expensive and may require specialized computing hardware, such as large data buffers for models. Cropping the images to only include the light source reduces the overall pixel data, but may not produce adequate results, as turn signals and other light sources are small and may be difficult to detect and distinguish.

In certain implementations, light status (such as on/off status) may be determined for individual frames, and stateful logic may be used to analyze the light status across multiple time frames to decide how light sources turn on and off over time to detect whether the light sources are blinking. However, such systems need to link AI/machine learning systems for light detection to subsequent stateful logic code, which may be extremely sensitive with multiple dependencies and may be highly complex, while still requiring models to be trained to detect individual light's status. Furthermore, it may be necessary perform tracking for the individual light sources between frames.

One solution to this problem is to utilize a comprehensive AI and machine learning detection system to determine when a light source in captured image frames is blinking. To reduce data bandwidth requirements, encodings can be generated for received image frames and may be combined with encodings for previous image frames. Rather than analyzing the image frames themselves, a model may instead be trained to analyze sequences of the encodings and may determine, based on the sequences, whether a corresponding light source is blinking. In particular, received image frames may be cropped or otherwise segmented to extract a light source that may be blinking. A first model may generate an encoding for the cropped image, and the encoding may be combined with a sequence of previous encodings for previously captured image frames (such as a rolling sequence of encodings). A second model may then analyze the sequence of encodings to determine a lighting determination that indicates whether the light source is blinking (such as according to a lighting protocol).

Particular implementations of the subject matter described in this disclosure may be implemented to realize one or more of the following potential advantages or benefits. In some aspects, the present disclosure provides techniques for image processing that may be particularly beneficial in smart vehicle applications. For example, the sequence of encodings may use significantly less memory than a corresponding sequence of image frames. The reduced data requirements thus enable the use of machine learning models to analyze multiple encodings from multiple times to detect whether light sources are blinking. Such systems dramatically reduce the complexity of blinking light detection systems and improve the accuracy and robustness of such systems by removing the need to combine machine learning techniques with stateful logic code. Overall, such systems may be capable of incorporating longer sequences of image information at reduced computational cost for processing, which can improve detection accuracy, reduce data storage costs/requirements, and reduce the need for large data buffers and other specialized computing hardware. Furthermore, the reduced input data size may reduce the computational resources needed at runtime when using such systems to detect blinking lights to operate or otherwise interface with a vehicle.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some embodiments, an additional camera may be located at the rear of the vehicle 100 and oriented such that the field of view of the additional camera captures a scene behind the vehicle 100 in the direction that the vehicle 100 is moving when in reverse mode or in a reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
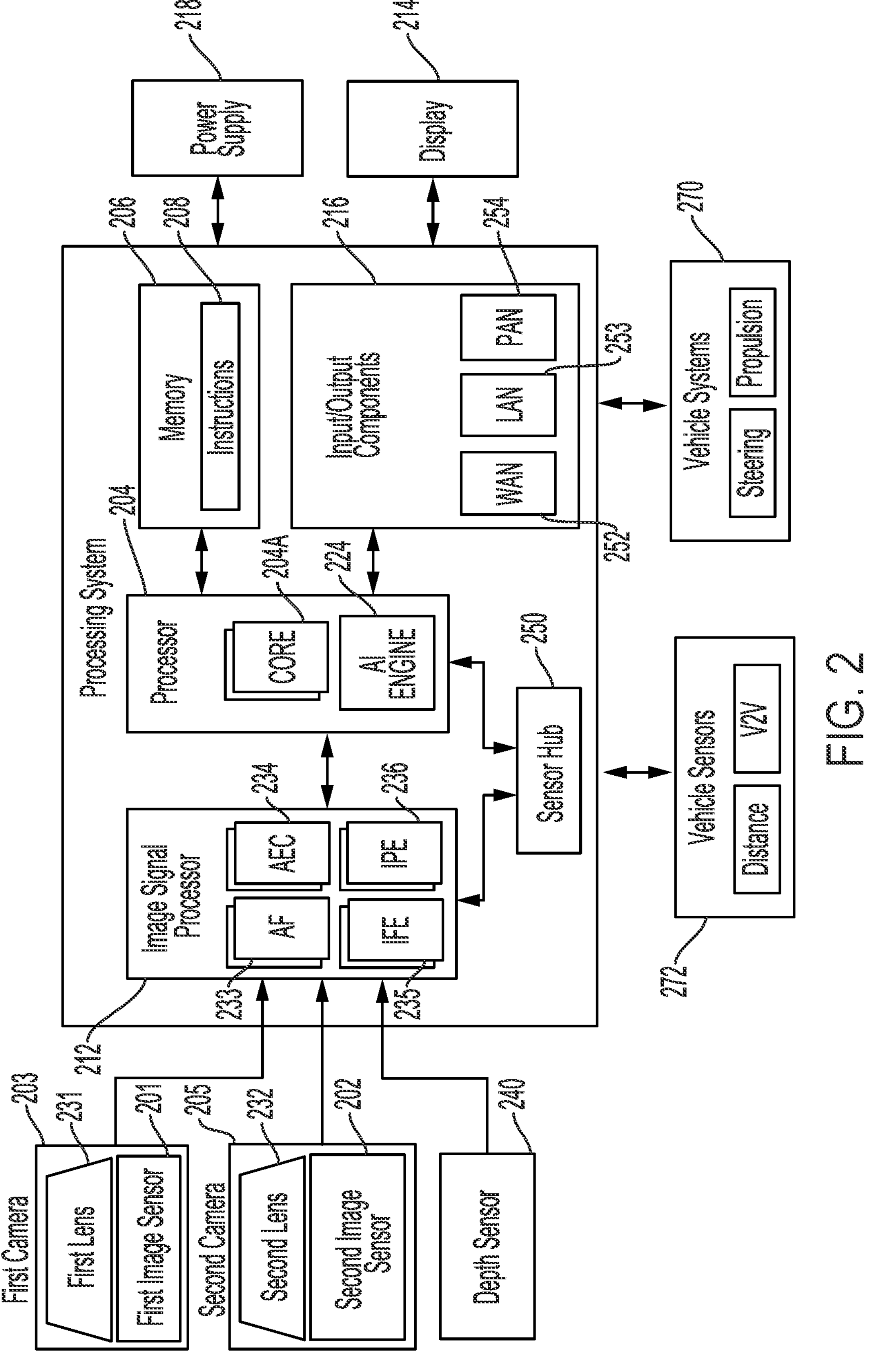
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The vehicle 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
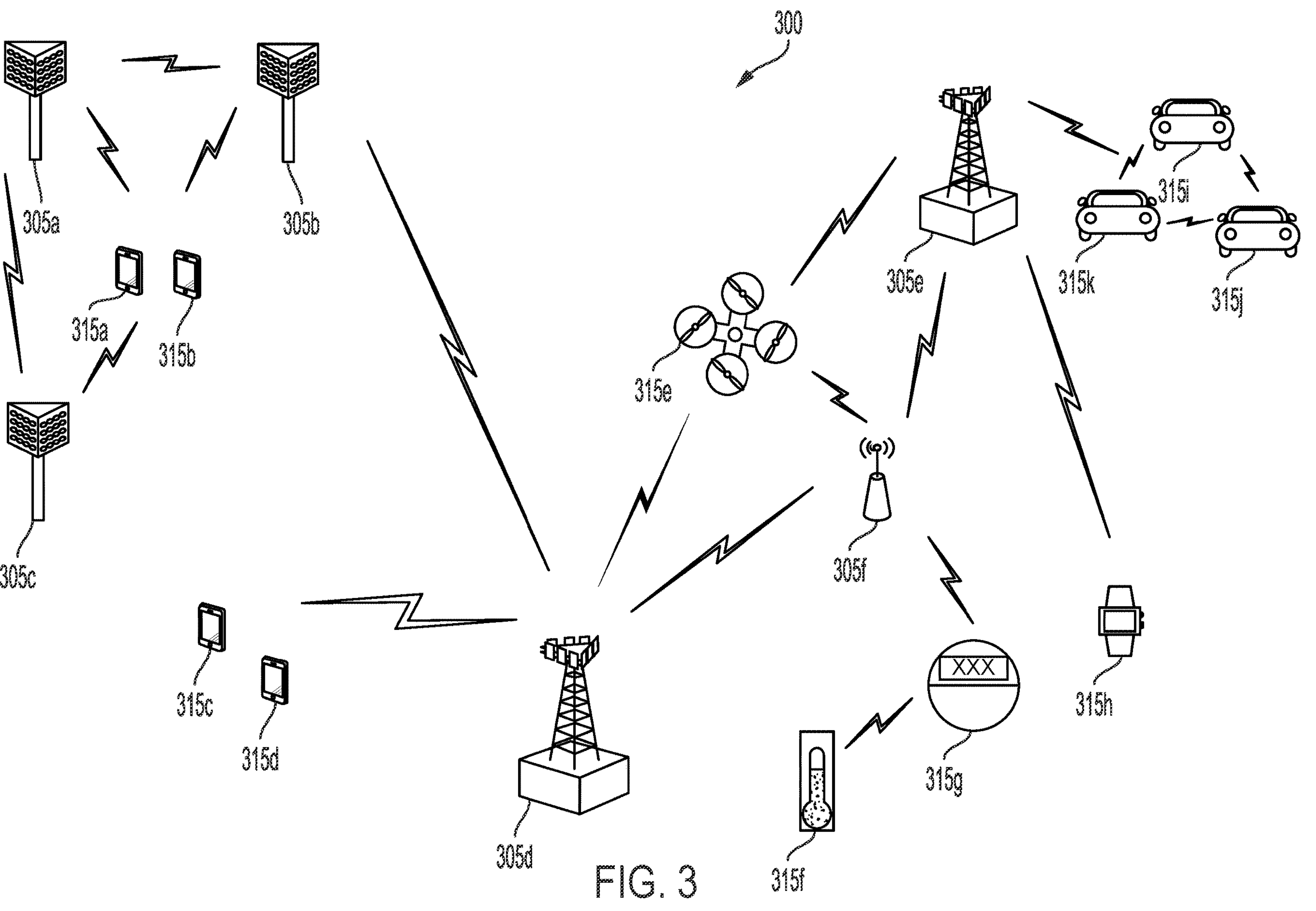
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multi-point (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*e*.

Figure 4:
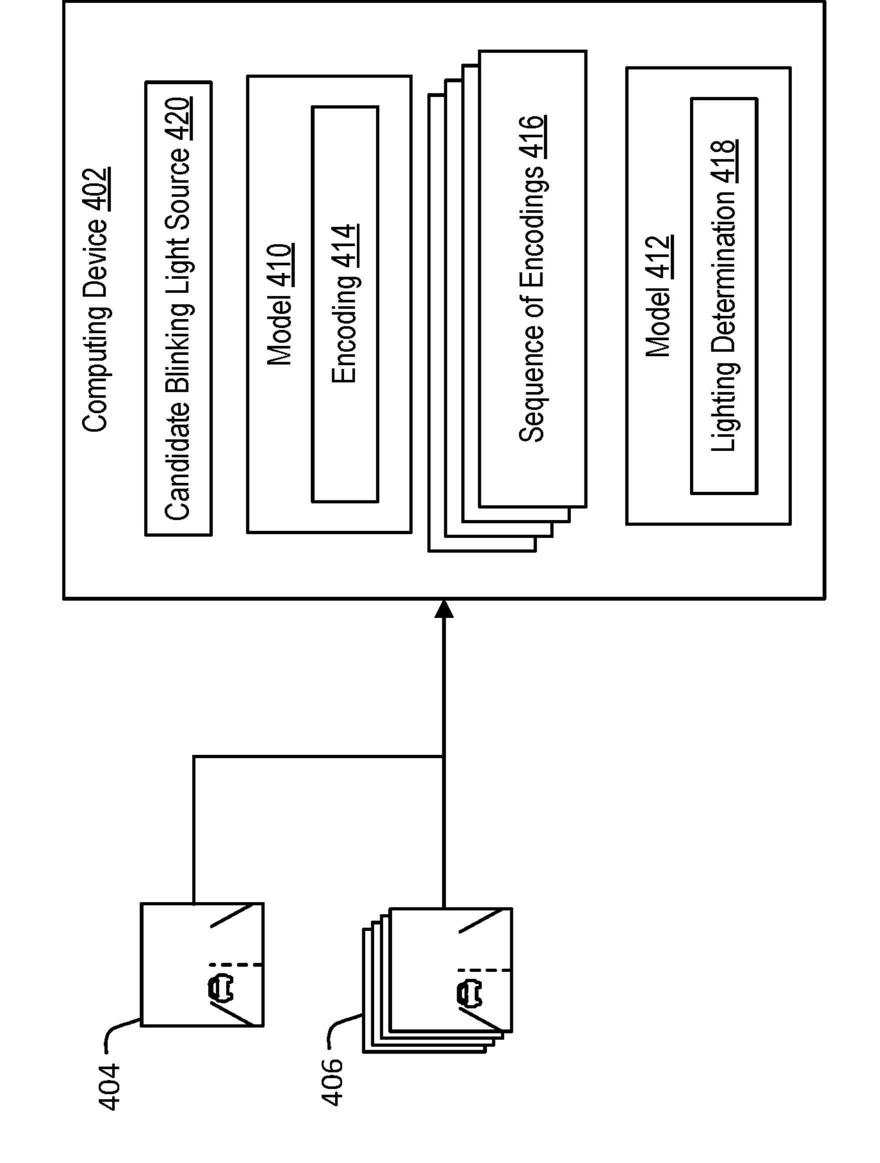
FIG. 4 is a block diagram illustrating a system for detecting a blinking light source according to an exemplary embodiment of the present disclosure.

Aspects of the vehicular systems described with reference to, and shown in, FIG. 1, FIG. 2, and FIG. 3 may include automated detection of when a light source in view of the vehicle is blinking. For example, FIG. 4 is a block diagram illustrating a system 400 for detecting a blinking light source according to an exemplary embodiment of the present disclosure. In particular, the system 400 may be an exemplary implementation of the processing system depicted in FIG. 2, or another computing system located on or within a vehicle, such as the vehicle 100.

The system 400 includes a computing device 402 that receives a first image frame 404 and a sequence of image frames 406. The first image frame 404 and the image frames 406 may be received individually (such as one at a time), or may be received together (such as within a single collection of multiple image frames. The computing device 402 includes a first model 410, a sequence of encodings 416, a second model 412. The first model 410 includes an encoding 414 and the second model 412 includes a lighting determination 418. In particular, the computing device 402 may be configured to determine a lighting determination 418 that indicates whether a candidate blinking light source 420 is blinking (such as blinking according to a lighting protocol).

During operation, the computing device 402 may be configured to receive a first image frame 404. In certain implementations, the first image frame 404 may be captured by an imaging system, such as an imaging system for a vehicle 100. For example, the first image frame 404 may be captured by a monocular imaging system coupled to the vehicle 100. In certain implementations, other types of imaging systems may be used, such as multi-camera imaging systems. In certain implementations, the first image frame 404 may be captured as part of a series of image frames (such as a video stream of image frames captured by the imaging system 400). For example, the first image frame 404 may be captured in sequence with the image frames 406, such as by the same imaging system as the image frames 406.

The computing device 402 may be configured to determine a subset of the first image frame 404 that contains a first candidate blinking light source 420. A candidate blinking light source 420 may be a light source configured to blink according to one or more lighting protocols, which may include combinations of one or more light sources blinking according to one or more frequencies or with one or more patterns. In certain implementations, candidate blinking light sources may include vehicle lights (such as turning signals, emergency signals, headlights, taillights), traffic lights, signs with lights, and the like. In certain implementations, candidate blinking light sources may blink according to a lighting protocol to indicate a corresponding status for the lighting protocol (such as a vehicle intending to turn, to indicate a potentially hazardous driving situation, to indicate a particular traffic condition, and the like). In certain implementations, the same candidate blinking light source 420 may be capable of blinking according to multiple lighting protocols. For example, exterior lights on a vehicle may blink according to a first lighting protocol (such as a single light blinking at a first frequency) to indicate that the vehicle intends to turn and may blink according to a second lighting protocol (such as multiple lights blinking simultaneously at a second frequency) to indicate a potentially hazardous driving situation.

In certain implementations, the computing device 402 may crop the first image frame 404 to contain the candidate blinking light source 420 and surrounding portions within the first image frame 404. For example, the first candidate blinking light source 420 may be a turn signal on a vehicle 100. In such instances, the subset of the first image frame 404 may be identified as the portion of the first image frame 404 containing a depiction of the rear of the vehicle 100, or a portion thereof. In certain implementations, the candidate blinking light source 420 may be identified using one or more image processing models, such as machine learning models, that are configured to track and verify vehicles within successive image frames, such as to track and verify that a car detected in the first image frame 404 is the same as vehicles detected in other image frames 406. In such implementations, the image processing models may be trained to detect different types of candidate blinking light sources. The computing device 402 may then crop the first image frame 404 based on the detected candidate blinking light source 420.

The computing device 402 may be configured to determine, with a first model 410, a first encoding 414 based on the subset of the first image frame 404. In certain implementations, the first model 410 may be an encoding model trained to generate encodings 414 that represent images containing candidate blinking light sources. In particular, the first model 410 may be a machine learning model, such as a neural network. In certain implementations, the encoding 414 may include a representation of the first candidate blinking light source 420 and surrounding portions within the subset of the first image frame 404. For example, the encoding 414 may include information representative of the rear of a vehicle, a traffic signal, a sign with one or more lights, or combinations thereof. For example, FIG. 5 depicts a training process 500 for an encoder model according to an exemplary embodiment of the present disclosure. The training process 500 includes an encoder 502, an encoding 510, a decoder 504. The encoder 502 may be an exemplary implementation of the model 410 and includes an input image frame 506. The decoder 504 includes an output image frame 508. In particular, the encoder 502 may be configured to determine an encoding 510 based on the input image frame 506 and the corresponding decoder 504 may be configured to determine the output image frame 508 based on the encoding 510. To train the encoder 502, the computing device 402 (or another computing device) may be configured to provide an input image frame 506 to the encoder 502, determine an encoding 510 using the 502, and generate an output image frame 508 based on the encodings 510 using the corresponding decoder 504. The output image frame 508 may then be compared to the input image frame 506 and the encoder 502 may be updated based on differences between the output image frame 508 and the input image frame 506. In particular, the training process 500 may be repeated for multiple image frames (such as 10 image frames, 50 image frames, 100 image frames, 500 image frames, 1000 image frames, or more). The encoder 502 may then be used as the first model 410 by a computing device 402 associated with a vehicle 100.

Returning to FIG. 4, the encoding 414 is a one-dimensional vector that contains numerical representations (such as integer representations, floating point representations, and the like) of multiple features. In certain implementations, the multiple features may be determined by the first model 410 (such as during a training process 500 of the model 410) and may correspond to one or more visual or spatial aspects of the first image frame 404. In certain implementations, the first model 410 may be trained to generate optimal encodings 414 that reduce the size of encodings 414 to a minimal number of features and corresponding values (such as 100 or fewer, 50 or fewer, 30 or fewer, and the like). For example, an objective function used to update the first model 410 during training may include a penalty measure based on the size of the encoding 414. In certain implementations, other implementations for encodings 414 may be utilized, such as multi-dimensional vectors or encodings 414 that include multiple vectors.

In certain implementations, the first model 410 may be selected, based on the first candidate blinking light source 420, from among a plurality of models. For example, the computing device 402 may include multiple models that can be used to generate encodings 414 for different types of candidate blinking light sources. For example, each of a plurality of models may be trained to determine encodings 414 for at least one type of candidate blinking light source 420, and the model 410 may be selected as corresponding to the type of candidate blinking light source detected within the first image frame 404 (such as a turn signal of a vehicle). In certain implementations, the computing device 402 may include multiple encoder models for different sizes of vehicles or different types of vehicles. For example, the computing device 402 may have different models for different vehicle body styles including sedan, SUV, sports car, crossover, motorcycle, and the like. In such implementations, the light source 420 may be a turn signal of a sedan vehicle, and the first model 410 may be selected as corresponding to turn signals of sedan vehicles. The computing device 402 may also include different encoder models for different driving situations, such as different weather conditions and vehicles located at different distances to a vehicle 100 from which the first image frame 404 was captured. In still further implementations, the computing device 402 may include different encoder models for other types of candidate blinking light sources, such as different types of traffic lights and traffic signs. In implementations where the computing device 402 includes multiple encoder models, the different encoder models may produce encodings 414 that are the same size, different sizes, or combinations thereof.

The computing device 402 may be configured to determine, with a second model 412 and based on a sequence of encodings 416, a lighting determination 418 for the first candidate blinking light source 420. In certain implementations, the lighting determination 418 indicates whether the first candidate blinking light source 420 is blinking according to a lighting protocol. For example, the lighting determination 418 may identify one or more lighting protocols for the first candidate blinking light source 420 and an indication of whether the first candidate blinking light source 420 is blinking according to corresponding lighting protocols (such as a Boolean indication corresponding to one or more of the lighting protocols).

In certain implementations, the second model 412 may be trained to receive sequences of encodings 416 of image frames and determine, based on the encodings 414 510, whether the encodings 416 indicate that the light source 420 blinking according to one or more lighting protocols. For example, the second model 412 may be implemented as a neural network.

The sequence of encodings 416 may include the first encoding 414. For example, the sequence of encodings 416 correspond to a sequence of image frames 406 that include the first image frame 404 and at least one of (i) previous image frames captured before the first image frame 404, (ii) subsequent image frames captured after the first image frame 404, or (iii) combinations thereof. In particular, the sequence of encodings 416 may include multiple encodings that each correspond to an image frame of the sequence of image frames 406. In certain implementations, the sequence of encodings 416 may be stored as an ordered sequence in which the encodings follow the same order in which the corresponding image frames 406 were captured or otherwise received by the computing device 402.

In certain implementations, the computing device 402 may be configured to determine lighting determinations 418 on a continuous basis. For example, the sequence of encodings 416 may be determined based on a current image frame and a predetermined number of preceding image frames 406, such as the preceding 10 image frames, 20 image frames, 30 image frames, 50 image frames). The computing device 402 may regularly determine the lighting determination 418 (such as for every new received image frame 404, for every second received image frame 404, for every five received image frames 404, and the like) to maintain an updated determination of the lighting protocols (such as to detect when a vehicle's turning signal stops blinking or changes lighting protocols).

In certain implementations, the lighting determination 418 may be used to control operation of a vehicle 100. For example, the computing device 402 may be configured to determine, based on the lighting determination 418, commands for a control system of the vehicle 100 and to operate the vehicle 100 according to the commands. The commands, when executed by the control system, may control one or more of an acceleration of the vehicle 100, deceleration of the vehicle 100, steering angle of the vehicle 100, and lighting system of the vehicle 100 (such as turning signals for the vehicle 100). For example, another vehicle may be changing lanes within a desired following distance for the vehicle 100, which may be detected as a lighting determination 418 corresponding to a turning signal for the vehicle. In response, the 402 may determine commands that, when executed by a control system for the vehicle 100, cause the vehicle 100 to decelerate in anticipation of the other vehicle's lane change such that, when complete, the desired following distance between the vehicles is maintained or quickly restored.

In certain implementations, the models 410, 412 may be implemented as one or more machine learning models, including supervised learning models, unsupervised learning models, other types of machine learning models, and/or other types of predictive models. For example, the models 410, 412 may be implemented as one or more of a neural network, a transformer model, a decision tree model, a support vector machine, a Bayesian network, a classifier model, a regression model, and the like. The models 410, 412 may be trained based on training data to determine encodings and lighting determinations, respectively. For example, one or more training datasets may be used that contain labeled training data and one or more expected outputs. Parameters of the models 410, 412 may be updated based on whether the models 410, 412 generate correct outputs when compared to the expected outputs. In particular, the models 410, 412 may receive one or more pieces of input data from the training data sets that are associated with a plurality of expected outputs. The models 410, 412 may generate predicted outputs based on a current configuration of the models 410, 412. The predicted outputs may be compared to the expected outputs and one or more parameter updates may be computed based on differences between the predicted outputs and the expected outputs. In particular, the parameters may include weights (e.g., priorities) for different features and combinations of features. The parameter updates the models 410, 412 may include updating one or more of the features analyzed and/or the weights assigned to different features or combinations of features (e.g., relative to the current configuration of the models 410, 412). In various implementations, the models 410, 412 may be trained separately or together.

Figure 6:
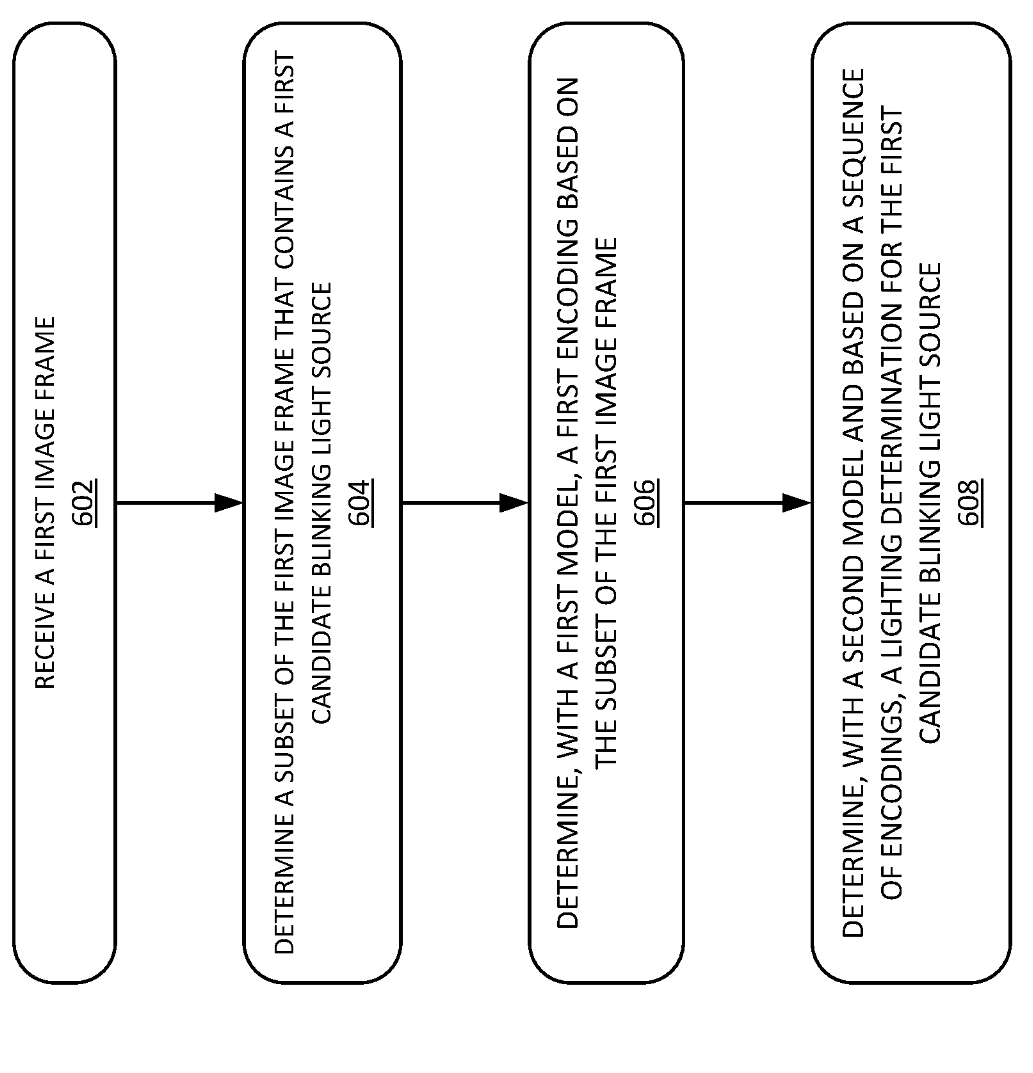
FIG. 6 is a flow chart illustrating an example method for automated detection of when a light source in view of the vehicle is blinking.

One method of performing image processing according to embodiments described above is shown in FIG. 6. FIG. 6 is a flow chart illustrating an example method 600 for automated detection of when a light source in view of the vehicle is blinking. The method may be performed by one or more of the above systems, such as the vehicle 100, the network 300, and systems 200, 400.

The method 600 includes receiving a first image frame (block 602). For example, the computing device 402 may receive a first image frame 404. In certain implementations, image frame may be captured by an imaging system 400, such as an imaging system 400 for a vehicle 100. In certain implementations, the image frame may be captured as part of a series of image frames (such as a video stream of image frames captured by the imaging system 400).

The method 600 includes determining a subset of the first image frame that contains a first candidate blinking light source (block 604). For example, the computing device 402 may determine a subset of the first image frame 404 that contains a first candidate blinking light source 420. In certain implementations, the first candidate blinking light source 420 may be a light source configured to blink according to one or more lighting protocols. In certain implementations, the computing device 402 may crop the first image frame 404 to contain the candidate blinking light source 420 and surrounding portions of the first image frame 404. In certain implementations, the first candidate blinking light source 420 may be a turn signal on a vehicle 100.

The method 600 includes determining, with a first model, a first encoding based on the subset of the first image frame (block 606). For example, the computing device 402 may determine, with a first model 410, a first encoding 414 based on the subset of the first image frame 404. In certain implementations, the first model 410 may be an encoding model trained to generate encodings 414 that represent images containing candidate blinking light sources. For example, the first model 410 may be trained according to a process similar to the training process 500. The encoding 414 may include a representation of the first candidate blinking light source 420 and surrounding portions within the subset of the first image frame 404. For example, the encoding 414 may be a one-dimensional vector that contains multiple numerical representations of corresponding features. In certain implementations, the first model 410 may be trained to reduce the size of the encoding 414 to a minimal number of features.

In certain implementations, the first model 410 may be selected, based on the first candidate blinking light source 420, from among a plurality of models. For example, each of the plurality of models may trained to determine encodings 414 for at least one type of candidate blinking light source and the first model 410 may be identified as corresponding to the candidate blinking light source 420. In certain implementations, the computing device 402 may include multiple encoder models for different sizes of vehicles 100 or different types of vehicles 100. The computing device 402 may also have include different encoder 502 models for different driving situations. In still further implementations, the computing device 402 may include different encoder models for other types of candidate blinking light sources, such as different types of traffic lights and signs.

The method 600 includes determining, with a second model and based on a sequence of encodings, a lighting determination for the first candidate blinking light source (block 608). For example, the computing device 402 may determine, with a second model 412 and based on a sequence of encodings 416, a lighting determination 418 for the first candidate blinking light source 420. The sequence of encodings 416 may include the first encoding 414. For example, the sequence of encodings 416 may correspond to a sequence of image frames 406 that include the first image frame 404 and at least one of (i) previous image frames captured before the first image frame 404, (ii) subsequent image frames captured after the first image frame 404, or (iii) combinations thereof.

In certain implementations, the lighting determination 418 indicates whether the first candidate blinking light source 420 is blinking according to a lighting protocol. In certain implementations, the lighting determination 418 may identify one or more lighting protocols for the first candidate blinking light source 420 and an indication of whether the first candidate blinking light source 420 is blinking according to corresponding lighting protocols. In certain implementations, the second model 412 may be trained to receive sequences of encodings 416 of image frames and determine, based on the encodings 416, whether the encodings 416 indicate that a light source depicted within the image frames is blinking. In certain implementations, the computing device 402 may be configured to determine lighting determinations 418 on a continuous basis.

In certain implementations, the method may further include determining, based on the lighting determination 418, commands for a control system 400 of a vehicle 100 and operating the vehicle 100 according to the commands. For example, the commands, when executed by the control system 400, may control one or more of an acceleration of the vehicle 100, deceleration of the vehicle 100, steering angle of the vehicle 100, and lighting system 400 of the vehicle 100.

It is noted that one or more blocks (or operations) described with reference to FIG. 6 may be combined with one or more blocks (or operations) described with reference to another of the figures. For example, one or more blocks (or operations) of FIG. 6 may be combined with one or more blocks (or operations) of FIGS. 1-5. As another example, one or more blocks associated with FIG. 6 may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein. A first aspect includes a method for image processing for use in a vehicle assistance system. The method also includes receiving a first image frame. The method also includes determining a subset of the first image frame that contains a first candidate blinking light source. The method also includes determining, with a first model, a first encoding based on the subset of the first image frame. The method also includes determining, with a second model and based on a sequence of encodings, a lighting determination for the first candidate blinking light source, where the sequence of encodings includes the first encoding. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first candidate blinking light source is identified as potentially blinking.

In a third aspect, in combination with the second aspect, the lighting determination indicates whether the first candidate blinking light source is blinking.

In a fourth aspect, in combination with one or more of the first aspect through the third aspect, the first candidate blinking light source is a turn signal on a vehicle.

In a fifth aspect, in combination with one or more of the first aspect through the fourth aspect, the first model is an encoding model trained to generate encodings that represent images containing candidate blinking light sources.

In a sixth aspect, in combination with one or more of the first aspect through the fifth aspect, the first encoding includes a one-dimensional vector that contains numerical representations of features within the subset of the first image frame.

In a seventh aspect, in combination with one or more of the first aspect through the sixth aspect, the sequence of encodings correspond to a sequence of image frames that include the first image frame and at least one of (i) previous image frames captured before the first image frame, (ii) subsequent image frames captured after the first image frame, or (iii) combinations thereof.

In an eighth aspect, in combination with one or more of the first aspect through the seventh aspect, the first model is selected, based on the first candidate blinking light source, from among a plurality of models.

In a ninth aspect, in combination with the eighth aspect, each of the plurality of models are trained to determine encodings for at least one type of candidate blinking light source.

In a tenth aspect, in combination with one or more of the first aspect through the ninth aspect, the method includes determining, based on the lighting determination, commands for a control system of a vehicle; and operating the vehicle according to the commands.

An eleventh aspect includes an apparatus. The apparatus also includes a memory storing processor-readable code. The apparatus also includes at least one processor coupled to the memory, the at least one processor configured to execute the processor-readable code to cause the at least one processor to perform operations including: receiving a first image frame; determining a subset of the first image frame that contains a first candidate blinking light source; determining, with a first model, a first encoding based on the subset of the first image frame; and determining, with a second model and based on a sequence of encodings, a lighting determination for the first candidate blinking light source, where the sequence of encodings includes the first encoding.

In a twelfth aspect, in combination with the eleventh aspect, the first candidate blinking light source is identified as potentially blinking.

In a thirteenth aspect, in combination with the twelfth aspect, the lighting determination indicates whether the first candidate blinking light source is blinking.

In a fourteenth aspect, in combination with one or more of the eleventh aspect through the thirteenth aspect, the first candidate blinking light source is a turn signal on a vehicle.

In a fifteenth aspect, in combination with one or more of the eleventh aspect through the fourteenth aspect, the first model is an encoding model trained to generate encodings that represent images containing candidate blinking light sources.

In a sixteenth aspect, in combination with one or more of the eleventh aspect through the fifteenth aspect, the first encoding includes a one-dimensional vector that contains numerical representations of features within the subset of the first image frame.

In a seventeenth aspect, in combination with one or more of the eleventh aspect through the sixteenth aspect, the sequence of encodings correspond to a sequence of image frames that include the first image frame and at least one of (i) previous image frames captured before the first image frame, (ii) subsequent image frames captured after the first image frame, or (iii) combinations thereof.

In an eighteenth aspect, in combination with one or more of the eleventh aspect through the seventeenth aspect, the first model is selected, based on the first candidate blinking light source, from among a plurality of models.

In a nineteenth aspect, in combination with the eighteenth aspect, each of the plurality of models are trained to determine encodings for at least one type of candidate blinking light source.

In a twentieth aspect, in combination with one or more of the eleventh aspect through the nineteenth aspect, the operations further include determining, based on the lighting determination, commands for a control system of a vehicle; and operating the vehicle according to the commands.

A twenty-first aspect includes a non-transitory computer-readable medium storing instructions that. The non-transitory computer-readable medium storing instructions also includes receiving a first image frame. The instructions also includes determining a subset of the first image frame that contains a first candidate blinking light source. The instructions also includes determining, with a first model, a first encoding based on the subset of the first image frame. The instructions also includes determining, with a second model and based on a sequence of encodings, a lighting determination for the first candidate blinking light source, where the sequence of encodings includes the first encoding.

In a twenty-second aspect, in combination with the twenty-first aspect, the first candidate blinking light source is identified as potentially blinking.

In a twenty-third aspect, in combination with the twenty-second aspect, the lighting determination indicates whether the first candidate blinking light source is blinking.

In a twenty-fourth aspect, in combination with one or more of the twenty-first aspect through the twenty-third aspect, the first model is an encoding model trained to generate encodings that represent images containing candidate blinking light sources.

In a twenty-fifth aspect, in combination with one or more of the twenty-first aspect through the twenty-fourth aspect, the sequence of encodings correspond to a sequence of image frames that include the first image frame and at least one of (i) previous image frames captured before the first image frame, (ii) subsequent image frames captured after the first image frame, or (iii) combinations thereof.

A twenty-sixth aspect includes a vehicle with an imaging system configured to capture images from the vehicle. The vehicle also includes a detection system configured to: receive a first image frame from the imaging system; determine a subset of the first image frame that contains a first candidate blinking light source; determine, with a first model, a first encoding based on the subset of the first image frame; and determine, with a second model and based on a sequence of encodings, a lighting determination for the first candidate blinking light source, where the sequence of encodings includes the first encoding.

In a twenty-seventh aspect, in combination with the twenty-sixth aspect, the first candidate blinking light source is identified as potentially blinking.

In a twenty-eighth aspect, in combination with the twenty-seventh aspect, the lighting determination indicates whether the first candidate blinking light source is blinking.

In a twenty-ninth aspect, in combination with one or more of the twenty-sixth aspect through the twenty-eighth aspect, the first model is an encoding model trained to generate encodings that represent images containing candidate blinking light sources.

In a thirtieth aspect, in combination with one or more of the twenty-sixth aspect through the twenty-ninth aspect, the sequence of encodings correspond to a sequence of image frames that include the first image frame and at least one of (i) previous image frames captured before the first image frame, (ii) subsequent image frames captured after the first image frame, or (iii) combinations thereof.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:

receiving a first image frame;

determining a subset of the first image frame that contains a first candidate blinking light source;

determining, with a first machine learning model, a first encoding representing visual features within the subset of the first image frame; and determining, with a second machine learning model and based on a sequence of encodings, a lighting determination for the first candidate blinking light source, wherein the sequence of encodings includes the first encoding, wherein the first machine learning model is selected, based on the first candidate blinking light source, from among a plurality of machine learning models, the plurality of machine learning models including a third machine learning model corresponding to a first type of candidate blinking light source and a fourth machine learning model corresponding to a second, different, type of candidate blinking light source.

2. The method of claim 1, wherein the first candidate blinking light source is identified as potentially blinking.

3. The method of claim 2, wherein the lighting determination indicates whether the first candidate blinking light source is blinking.

4. The method of claim 1, wherein the first candidate blinking light source is a turn signal on a vehicle.

5. The method of claim 1, wherein the first machine learning model is an encoding model trained to generate encodings that represent images containing candidate blinking light sources.

6. The method of claim 1, wherein the first encoding includes a one-dimensional vector that contains numerical representations of features within the subset of the first image frame.

7. The method of claim 1, wherein the sequence of encodings correspond to a sequence of image frames that include the first image frame and at least one of (i) previous image frames captured before the first image frame, (ii) subsequent image frames captured after the first image frame, or (iii) combinations thereof.

8. The method of claim 1, wherein each of the plurality of machine learning models are trained to determine encodings for at least one type of candidate blinking light source.

9. The method of claim 1, further comprising:

determining, based on the lighting determination, commands for a control system of a vehicle; and operating the vehicle according to the commands.

10. The method of claim 1, wherein the first machine learning model is selected based on the first candidate blinking light source and a size of a vehicle associated with the vehicle assistance system, the size of the vehicle being from among a plurality of predetermined sizes of vehicles.

11. The method of claim 1, wherein the first machine learning model is selected based on the first candidate blinking light source and a type of a vehicle associated with the vehicle assistance system, the type of the vehicle being from among a plurality of types of vehicles.

12. An apparatus, comprising:

a memory storing processor-readable code; and at least one processor coupled to the memory, the at least one processor configured to execute the processor-readable code to cause the at least one processor to perform operations including:

receiving a first image frame;

determining a subset of the first image frame that contains a first candidate blinking light source;

determining, with a first machine learning model, a first encoding representing visual features within the subset of the first image frame; and determining, with a second machine learning model and based on a sequence of encodings, a lighting determination for the first candidate blinking light source, wherein the sequence of encodings includes the first encoding, wherein the first machine learning model is selected, based on the first candidate blinking light source, from among a plurality of machine learning models, the plurality of machine learning models including a third machine learning model corresponding to a first type of candidate blinking light source and a fourth machine learning model corresponding to a second, different, type of candidate blinking light source.

13. The apparatus of claim 12, wherein the first candidate blinking light source is identified as potentially blinking.

14. The apparatus of claim 13, wherein the lighting determination indicates whether the first candidate blinking light source is blinking.

15. The apparatus of claim 12, wherein the first candidate blinking light source is a turn signal on a vehicle.

16. The apparatus of claim 12, wherein the first machine learning model is an encoding model trained to generate encodings that represent images containing candidate blinking light sources.

17. The apparatus of claim 12, wherein the first encoding includes a one-dimensional vector that contains numerical representations of features within the subset of the first image frame.

18. The apparatus of claim 12, wherein the sequence of encodings correspond to a sequence of image frames that include the first image frame and at least one of (i) previous image frames captured before the first image frame, (ii) subsequent image frames captured after the first image frame, or (iii) combinations thereof.

19. The apparatus of claim 12, wherein each of the plurality of machine learning models are trained to determine encodings for at least one type of candidate blinking light source.

20. The apparatus of claim 12, wherein the operations further comprise:

determining, based on the lighting determination, commands for a control system of a vehicle; and operating the vehicle according to the commands.

21. A non-transitory computer-readable medium storing instructions that, when executed by a processor, cause the processor to perform operations comprising:

receiving a first image frame;

determining a subset of the first image frame that contains a first candidate blinking light source;

determining, with a first machine learning model, a first encoding representing visual features within the subset of the first image frame; and determining, with a second machine learning model and based on a sequence of encodings, a lighting determination for the first candidate blinking light source, wherein the sequence of encodings includes the first encoding, wherein the first machine learning model is selected, based on the first candidate blinking light source, from among a plurality of machine learning models, the plurality of machine learning models including a third machine learning model corresponding to a first type of candidate blinking light source and a fourth machine learning model corresponding to a second, different, type of candidate blinking light source.

22. The non-transitory computer-readable medium of claim 21, wherein the first candidate blinking light source is identified as potentially blinking.

23. The non-transitory computer-readable medium of claim 22, wherein the lighting determination indicates whether the first candidate blinking light source is blinking.

24. The non-transitory computer-readable medium of claim 21, wherein the first machine learning model is an encoding model trained to generate encodings that represent images containing candidate blinking light sources.

25. The non-transitory computer-readable medium of claim 21, wherein the sequence of encodings correspond to a sequence of image frames that include the first image frame and at least one of (i) previous image frames captured before the first image frame, (ii) subsequent image frames captured after the first image frame, or (iii) combinations thereof.

26. A vehicle comprising:

an imaging system configured to capture images from the vehicle; and a detection system configured to:

receive a first image frame from the imaging system;

determine a subset of the first image frame that contains a first candidate blinking light source;

determine, with a first machine learning model, a first encoding representing visual features within the subset of the first image frame; and determine, with a second machine learning model and based on a sequence of encodings, a lighting determination for the first candidate blinking light source, wherein the sequence of encodings includes the first encoding, wherein the first machine learning model is selected, based on the first candidate blinking light source, from among a plurality of machine learning models, the plurality of machine learning models including a third machine learning model corresponding to a first type of candidate blinking light source and a fourth machine learning model corresponding to a second, different, type of candidate blinking light source.

27. The vehicle of claim 26, wherein the first candidate blinking light source is identified as potentially blinking.

28. The vehicle of claim 27, wherein the lighting determination indicates whether the first candidate blinking light source is blinking.

29. The vehicle of claim 26, wherein the first machine learning model is an encoding model trained to generate encodings that represent images containing candidate blinking light sources.

30. The vehicle of claim 26, wherein the sequence of encodings correspond to a sequence of image frames that include the first image frame and at least one of (i) previous image frames captured before the first image frame, (ii) subsequent image frames captured after the first image frame, or (iii) combinations thereof.

* * * * *